United States Patent  [11] 3,607,749

| [72] | Inventor | Eric Simon Forbes<br>Knaphill, Woking, Surrey, England |
|---|---|---|
| [21] | Appl. No. | 777,176 |
| [22] | Filed | Nov. 19, 1968 |
| [45] | Patented | Sept. 21, 1971 |
| [73] | Assignee | The British Petroleum Company, Limited<br>London, England |
| [32] | Priority | Dec. 5, 1967 |
| [33] | | Great Britain |
| [31] | | 55294/67 |

[54] VISCOSITY INDEX IMPROVERS
4 Claims, No Drawings

[52] U.S. Cl. .................................................. 252/56, 252/59
[51] Int. Cl. ........................................................ C10m 1/28
[50] Field of Search ............................................ 252/56, 59

[56] References Cited
UNITED STATES PATENTS

| 2,336,195 | 12/1943 | Sparks et al. | 252/56 |
| 2,967,827 | 1/1961 | Bolt et al. | 252/56 X |
| 2,992,987 | 7/1961 | Fields | 252/56 |
| 3,009,895 | 11/1961 | Slocombe | 252/56 X |
| 3,291,737 | 12/1966 | Saines et al. | 252/56 |
| 3,298,951 | 1/1967 | Guminski | 252/59 X |

*Primary Examiner*—Daniel E. Wyman
*Assistant Examiner*—W. Cannon
*Attorney*—Morgan, Finnegan, Durham & Pine

ABSTRACT: Viscosity Index improvers for lubricating oils comprise a polymer of molecular weight above 100,000 e.g. a polymethacrylate, and a polymer of molecular weight below 25,000 e.g. a polyisobutylene. The low molecular weight polymer increases the shear-stability of high molecular weight polymer.

VISCOSITY INDEX IMPROVERS

This invention relates to Viscosity Index improvers for lubricating compositions.

The Viscosity Index, (hereinafter referred to as the V.I.) of a lubricating oil is a measure of the variation of viscosity of the oil with change in temperature. The higher the V.I. of an oil the smaller is the variation of viscosity with changes in temperature.

In many applications of lubricant compositions the lubricant has to remain effective over a wide range of temperatures and consequently a high V.I. oil is required. For example, in the internal combustion engine used in motor cars, it is desirable to have a lubricating oil which retains its viscosity at high temperatures so that the engine is satisfactorily lubricated and oil consumption is kept to an acceptable figure. However at low temperature the viscosity of the oil must be sufficiently low to enable the engine to start easily and to reduce the power losses due to the oil viscosity.

Normal mineral base oils do not, of themselves, have adequate viscosity/temperature properties for all-the-year-round use in modern internal combustion engines, and additives have to be included in lubricating oils to improve the oils. These additives increase the V.I. of the oils and are known as V.I. improvers.

V.I. improvers are very well known and widely used additives in the lubrication art and a variety of compounds have been suggested for this purpose. One class of V.I. improvers include long chain polymeric compounds which function by changing their molecular configuration with changes in temperature. At low temperatures they consist of predominantly 'coiled' molecules and, as the temperature rises, they become progressively more 'uncoiled' and thus partially compensate for the decreasing viscosity of the base oil. Variations in solubility of the V.I. improvers in the base oil and changes in the nature of the solution of the V.I. improver in the base oil can also effect the V.I. of the composition.

Typical V.I. improvers are the high molecular weight polymethacrylates, polyalkylmethacrylates, high molecular weight polymeric hydrocarbons such as polyolefins, polydienes, alkylated polystyrenes, and high molecular weight polyesters, though a very wide range of other polymers have been used. The very long chain length of the polymers used as V.I. improvers makes them susceptible to degradation as a result of shearing forces, and the lower molecular weight compounds formed by such degradation are much less effective as V.I. improvers. Thus V.I. improvers can lose their effectiveness during use and the quality of the lubricating composition incorporating them might consequently be reduced.

We have now found that the addition of a low molecular weight substantially shear-stable polymer to a lubricating composition containing a high molecular weight polymeric V.I. improver brings about an unexpected increase in the shear-stability of the high molecular weight polymer.

According to the invention there is provided a lubricating composition comprising a blend of a mineral or synthetic base oil, a polymeric Viscosity Index improver of molecular weight at least 30,000 and a substantially shear-stable low molecular weight polymer of molecular weight below about 25,000.

By Viscosity Index improver is meant a polymeric compound of molecular weight above 30,000 which has the property of increasing the Viscosity Index of a mineral or synthetic base oil when added thereto.

Examples of suitable polymeric V.I. improvers include polyesters, for example polyalkylmethacrylates preferably of molecular weight above 100,000 and more preferably above 350,000; polyolefins of molecular weight above 40,000 and more preferably above 80,000 e.g. polyisobutylenes and poly 4-methylpentene-1. The most preferred V.I. improvers are the long chain polyalkylmethacrylates.

By low molecular weight polymer is meant a polymeric substance of molecular weight below about 25,000 and preferably below 10,000. Examples of suitable polymers are the polyolefins e.g. the polyisobutylenes, and poly α-olefins such as poly 4-methylpentene-1; polyesters such as the polymethacrylates, and polyethers.

The shear-stabilty of a polymer can be measured by dissolving the polymer in a solvent, passing the solution through a shearing device, and measuring the change in viscosity of the solution. A drop in viscosity greater than the drop in viscosity accountable by shearing of the solvent (if any) would indicate the polymer has undergone shearing. A suitable technique is to pass the polymer solution under pressure through an orifice and example of this technique is the Diesel Injector Rig Test.

Different types of polymers vary in their shear-stability, and the substantially shear-stable polymers useful in the present invention should be chosen so that their chain length and hence their molecular weight is sufficiently low for their molecular type so that they undergo only minimal shearing in shearing devices.

Preferably the low molecular weight polymer should be present in an amount of from one-half percent by weight based on the weight of base oil and up to 15 percent weight and more preferably should be present in an amount of 1 percent to 10 percent by weight.

The polymeric V.I. improver is present in an amount which is sufficient to form a lubricating composition of the requisite V.I. V.I. improvers are normally incorporated in an amount of 0.1 percent to 15 percent by weight based on the weight of the base oil and preferably are incorporated in an amount of 1 percent to 10 percent by weight.

The low molecular weight polymers are virtually shear stable, and after they have been subjected to shearing forces their viscosity and average molecular weight are substantially unaltered. It is very unexpected and surprising that the addition of a low molecular weight polymer to a lubricating composition containing a high molecular weight V.I. improver can affect the shear-stability of the V.I. improver. It would be expected that the low molecular weight polymer would have no effect on the shear-stability of the V.I. improver.

The molecular weights referred to in the specification refer to weight average molecular weights as determined, for example, by ultracentrifugation. See Encyclopedia of Polymer Science and Technology, Vol. 9 (1968), page 189, A Textbook of Physical Chemistry MacMillan pages 1256–1258, Elements of Physical Chemistry, 2nd Ed. (1960), pages 593–594, Glasstone and Lewis (Van Nostrand), or Physical Chemistry of Macromolecules (1961), pages 364–390, (Wiley).

The increase in shear-stability of a high molecular weight V.I. improver by the addition of a low molecular weight polymer is shown in the following example.

EXAMPLE

A base liquid had a long chain polyalkylmethacrylate V.I. improver of molecular weight about 500,000 dissolved in it. Various low molecular weight polymers were also dissolved in the base liquid and the composition subjected to a Diesel Injector Rig Test. This test involves placing 50 ml. of the test oil in a glass reservoir and pumping it through a diesel injector at 3,000 p.s.i. and at ambient temperature and then into a receiving vessel, this constitutes 1 cycle. The viscosity was measured before and after the test.

The loss of viscosity after the test was measured as a percentage of the viscosity increase arising from the V.I. improver only.

Polymer A was polymer of 4-methylpentene-1 of molecular weight 4,000. Polymer B was a polymer of isobutylene of molecular weight 2,000. Polymer C was polyalkylmethacrylate molecular weight 20,000

The results are shown in the Table.

TABLE

| Base liquid | Amount of high molecular weight polymer, percent | Low molecular weight polymer | Amount of low molecular weight polymer, percent | No. of cycles | Viscosity loss |
|---|---|---|---|---|---|
| Centane | 2 | None | | 10 | 50.0 |
| Do | 2 | A | 6 | 10 | 12.5 |
| Do | 2 | B | 6 | 10 | 15.0 |
| Light liquid paraffin. | 2 | None | | 10 | 50.0 |
| Do | 2 | A | 6 | 10 | 23.0 |
| Do | 2 | B | 6 | 10 | 32.0 |
| Do | 2 | C | 6 | 10 | 22.0 |
| Do | 2 | A | 10 | 10 | 11.3 |
| Do | 2 | B | 10 | 10 | 19.7 |
| Do | 2 | C | 10 | 10 | 14.2 |
| Do | 4 | A | 6 | 10 | 24.2 |
| Do | 4 | B | 6 | 10 | 30.8 |
| Do | 4 | C | 6 | 10 | 28.1 |
| Do | 2 | None | | 1 | 18.5 |
| Do | 2 | A | 6 | 1 | 9.6 |
| Do | 2 | B | 6 | 1 | 12.4 |
| Do | 2 | C | 6 | 1 | 7.9 |
| Do | 2 | A | 10 | 1 | 4.7 |
| Do | 2 | B | 10 | 1 | 9.0 |
| Do | 2 | C | 10 | 1 | 6.7 |
| Do | 4 | A | 6 | 1 | 8.3 |
| Do | 4 | B | 6 | 1 | 11.9 |
| 50/50 mixture of light and heavy liquid paraffins. | 2 | None | | 1 | 23.9 |
| Do | 2 | A | 6 | 1 | 10.8 |
| Do | 2 | B | 6 | 1 | 13.8 |
| Do | 2 | C | 6 | 1 | 16.4 |

As can be seen from the Table the addition of the low molecular weight polymer brings about a significant decrease in the viscosity loss arising from shearing of the high molecular weight V.I. improver.

What we claim is:

1. A lubricating composition comprising a blend of a major part of a mineral or synthetic lubricating base oil and a minor but viscosity index improving part of polyalkylmethacrylate viscosity index improver of weight average molecular weight above 100,000 and a minor but shear stabilizer amount of a substantially shear-stable polymer, selected from the group consisting of poly-4-methylpentere-1, polyisobutylene and polyalkylmethacrylates of weight average molecular weight below about 25,000 said molecular weights being determined by ultracentrifugation 2. The lubricating composition of claim 1 in which the polyalkylmethacrylate viscosity index improver has a weight average molecular weight above 350,000

3. The lubricating composition of claim 2 which contains from about 1 percent to 10 percent by weight of the polyalkylmethacrylate viscosity index improver and from about 1 percent to 10 percent by weight of the substantially shear-stable polymer.

4. The lubricating composition of claim 3 in which the substantially shear-stable polymer is selected from the group consisting of poly-4-methylpentene-1 and polyisobutylene of weight average molecular weight below about 10,000.

PO-1050
(5/69)

UNITED STATES PATENT OFFICE
CERTIFICATE OF CORRECTION

Patent No. 3,607,749      Dated September 21, 1971

Inventor(s)     Eric Simon Forbes

It is certified that error appears in the above-identified patent and that said Letters Patent are hereby corrected as shown below:

Claim 1, line 10, "stabilizer" should be - - stabilizing - -

Signed and sealed this 4th day of July 1972.

(SEAL)
Attest:

EDWARD M. FLETCHER, JR.            ROBERT GOTTSCHALK
Attesting Officer                    Commissioner of Patents